United States Patent [19]
Webb et al.

[11] Patent Number: 5,273,611
[45] Date of Patent: Dec. 28, 1993

[54] APPARATUS FOR APPLYING A CONTINUOUS FILM TO A PIPELINE

[75] Inventors: Brian C. Webb, Tulsa, Okla.; Donald Hoff, Aurora, Colo.; John Hoff, Tulsa, Okla.

[73] Assignee: SIG-A-RAP, Englewood, Colo.

[21] Appl. No.: 877,803

[22] Filed: May 4, 1992

[51] Int. Cl.$^5$ .............................................. B32B 1/08
[52] U.S. Cl. .................................... 156/392; 156/461
[58] Field of Search ............... 156/187, 392, 443, 461, 156/185, 188, 200, 201, 202, 203, 215, 391, 466

[56] References Cited

U.S. PATENT DOCUMENTS

| | | |
|---|---|---|
| 1,969,947 | 8/1934 | Rosener . |
| 2,044,456 | 6/1936 | Yeager ................................ 156/392 |
| 3,223,571 | 12/1965 | Straughan . |
| 3,470,057 | 9/1969 | Stuart, Jr. . |
| 3,733,382 | 5/1973 | Van Dijk . |
| 3,813,272 | 5/1974 | Straughan . |
| 3,823,883 | 7/1974 | Fenci et al. . |
| 3,941,531 | 3/1976 | Parker . |
| 3,994,766 | 11/1976 | Dedels . |
| 4,008,114 | 2/1977 | Lindsey . |
| 4,056,161 | 11/1977 | Allen, Jr. . |
| 4,058,427 | 11/1977 | Wilson . |
| 4,061,513 | 12/1977 | Danielson . |
| 4,084,306 | 4/1978 | Barker . |
| 4,094,715 | 6/1978 | Henderson et al. . |
| 4,113,545 | 9/1978 | Stuart, Jr. . |
| 4,125,422 | 11/1978 | Stuart, Jr. . |
| 4,134,782 | 1/1979 | Straughan . |
| 4,145,243 | 3/1979 | Cottam . |
| 4,201,032 | 5/1980 | Sangalli . |
| 4,213,486 | 7/1980 | Samour et al. . |
| 4,268,334 | 5/1981 | Harris et al. . |
| 4,270,963 | 6/1981 | Howat ................................ 156/201 |
| 4,322,262 | 3/1982 | Cottam . |
| 4,358,064 | 11/1982 | Garneau . |
| 4,372,796 | 2/1983 | Greuel, Jr. . |
| 4,426,834 | 1/1984 | Dokmo et al. . |
| 4,603,516 | 8/1986 | Hoffman . |
| 4,688,374 | 8/1987 | Walker . |

*Primary Examiner*—Michael W. Ball
*Assistant Examiner*—Richard Crispino
*Attorney, Agent, or Firm*—Head & Johnson

[57] ABSTRACT

An apparatus for applying a continuous film to a tube. A carriage allows the apparatus to move axially along the exterior of the tube. A film holder retains and dispenses the continuous film. A mechanism is provided to change the orientation of the film after being dispensed from the film holder. Guide rollers spaced radially and axially about the tube shape the continuous film longitudinally about the circumference of the tube.

12 Claims, 4 Drawing Sheets

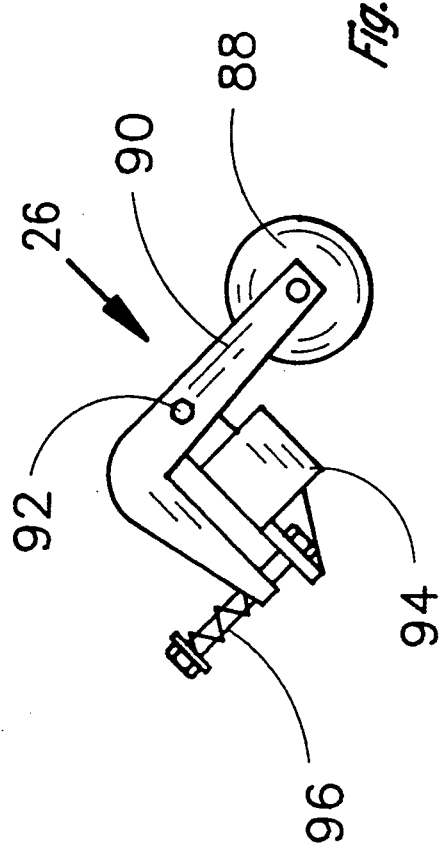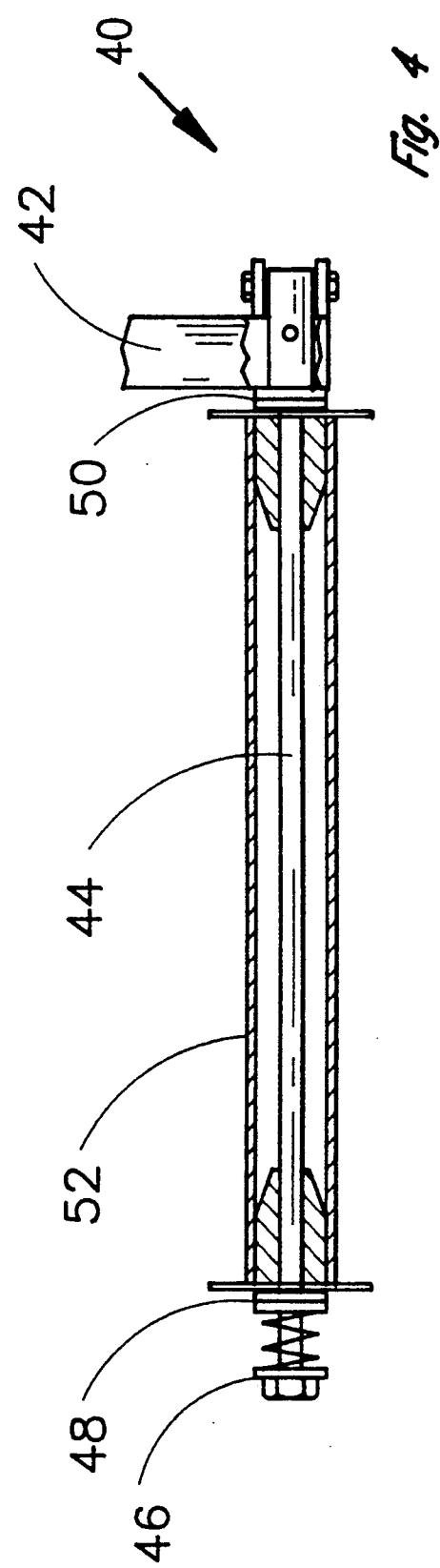

APPARATUS FOR APPLYING A CONTINUOUS FILM TO A PIPELINE

BACKGROUND OF THE INVENTION

1. Field of the Invention

The present invention relates to an apparatus to wrap a continuous film or tape longitudinally around a tube or pipe.

2. Prior Art

It will often be desirable to apply a protective film or tape wrapping to the exterior surface of a pipeline. The film or tape wrapping may be applied for a number of reasons. The film or wrapping may be used to insulate the pipeline from extreme temperatures. The film may also be used to insulate the pipeline from water or other corrosive materials.

Oftentimes, the protective film or wrapping will be applied in the field after the pipeline has been installed. It may be applied to an aboveground pipeline wherein the pipe is readily accessible. Alternatively, it may be applied to an underground pipe wherein the pipe must be initially be uncovered before the film or wrapping may be applied.

A tape wrapping apparatus to be used in these applications must be small enough and light enough to be transported to the field location. It must also be compact enough to be used in a trench or ditch wherein a pipeline has been uncovered.

Previous efforts have been made to produce an apparatus to wrap a film around a pipeline.

Dokmo et al. (U.S. Pat. No. 4,426,834) discloses an example of a wrapping machine for helical rotation of tape about a pipe.

Walker (U.S. Pat. No. 4,688,374) discloses a tape wrapping machine having rollers that engage the outside of the pipe for rotation of the pipe.

The Straughn patents (U.S. Pat. Nos. 3,223,572, 3,813,272 and 4,134,782) provide for the longitudinal application of film to a pipeline wherein the film will result in a single continuous seam. A film folder has a smooth, wing-shaped shoulder portion and a rearward tubular portion. As the film is drawn over the shoulder portion, it is shaped into a continuous tubular wrap.

None of the prior art discloses a compact and readily transportable device to wrap a film or tape longitudinally about a pipeline.

Accordingly, it is an object and purpose of the present invention to provide an apparatus to longitudinally wrap a continuous film or tape on a pipeline.

It is a further object and purpose of the present invention to provide an apparatus to longitudinally wrap a continuous film or tape on a pipeline wherein the film has adhesive on one side and wherein a backing layer may be removed prior to application to the pipeline.

SUMMARY OF THE INVENTION

A film or tape wrapping apparatus of the present invention is used to apply a continuous film or tape onto a tube or pipeline having a generally circular cross-section.

A carriage assembly allows the apparatus to be transported axially along the exterior of the pipeline. The carriage assembly includes a circumferential frame which surrounds and is spaced from the pipeline. A pair of support rollers extend from the circumferential frame and support the apparatus on the pipeline. A pair of adjustable rollers also extend from the frame and engage the pipeline.

The circumferential frame has a hinged portion which moves from an open position for insertion or removal of the pipeline to a closed position for operation.

The carriage assembly includes a boom arm that extends longitudinally from the circumferential frame. The boom arm extends axially with relation to the pipeline. The boom arm terminates in a pair of boom rollers which engage the pipeline.

A film holder assembly is utilized to retain and dispense the continuous film which is supplied from a roll. The film holder assembly includes an arm extending from the boom arm. The arm terminates in a film roll rod which is perpendicular to the axis of the pipeline. A pair of fiber or asbestos pads is retained about the film roll providing a constant source of friction so that the film roll will not overrun.

The film itself may have an adhesive on one side with a backing layer secured to the adhesive side. A take-up rod is spaced from and parallel to the film roll. As the film is unwound from the roll for application to the pipeline, the backing layer is separated from the film and will be wound onto the take-up rod. A constant rotational force may be supplied to the take-up rod during operation.

As the film is unwound from the roll, the non-adhesive side will pass over a series of orientation changing rollers so that the adhesive side will face the pipeline.

A first stage guide roller presses a center portion of the film against the base of the pipeline. The adhesive causes the film to be affixed to the pipeline. A pair of spaced, adjacent second stage rollers are spaced approximately 40 degrees radially on each side of the first roller and are spaced axially from the first roller. A pair of third stage rollers are spaced radially approximately 40 degrees more than the second stage rollers. The third stage rollers are also spaced axially from the second stage rollers. A final pair of fourth stage rollers are spaced radially 40 degrees from the third set of rollers and are spaced axially from the third stage rollers.

The apparatus moves along the pipeline until the film is pressed against the entire circumference of the pipeline with a longitudinal seam running axially along the pipeline.

BRIEF DESCRIPTION OF THE DRAWINGS

FIG. 4 is a sectional view of a film roll rod and tape roll used in the apparatus for applying a continuous film to a tube; and FIG. 5 is a view of one of the adjustable rollers apart from the apparatus for applying a continuous film to a tube.

DETAILED DESCRIPTION OF THE PREFERRED EMBODIMENT

Figure 1:
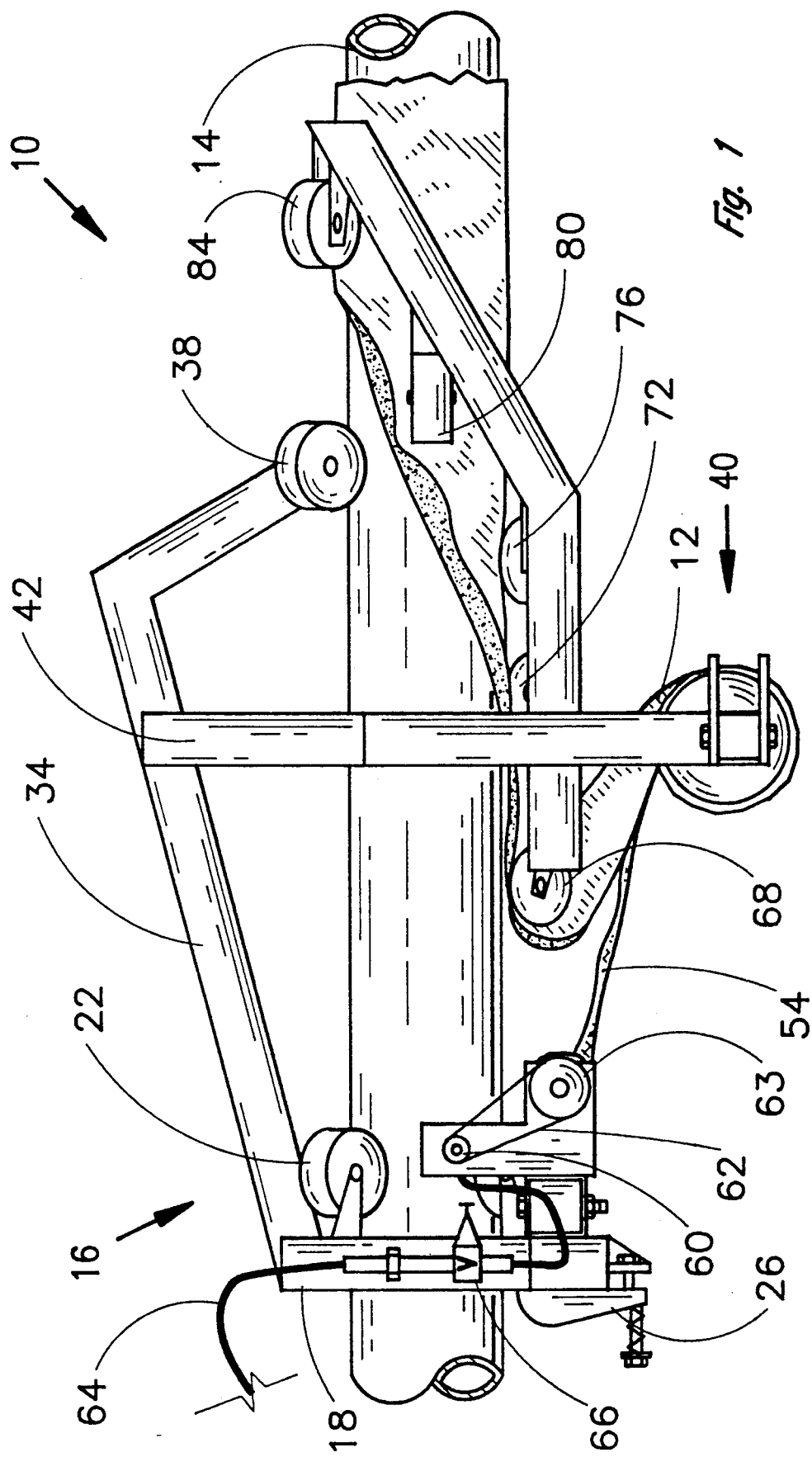
FIG. 1 is a perspective view of an apparatus for applying a continuous film to a tube constructed in accordance with the present invention.

Referring to the drawings in detail, FIG. 1 is a perspective view of a film or tape wrapping apparatus 10 constructed in accordance with the present invention and shown in use with a pipeline 14. The pipeline has a generally circular cross-section. The apparatus may be used to apply a continuous film or tape 12 onto a pipeline in the field. Only a portion of the pipeline 14 is seen in FIG. 1 with the ends of the pipeline cutaway.

Figure 2:
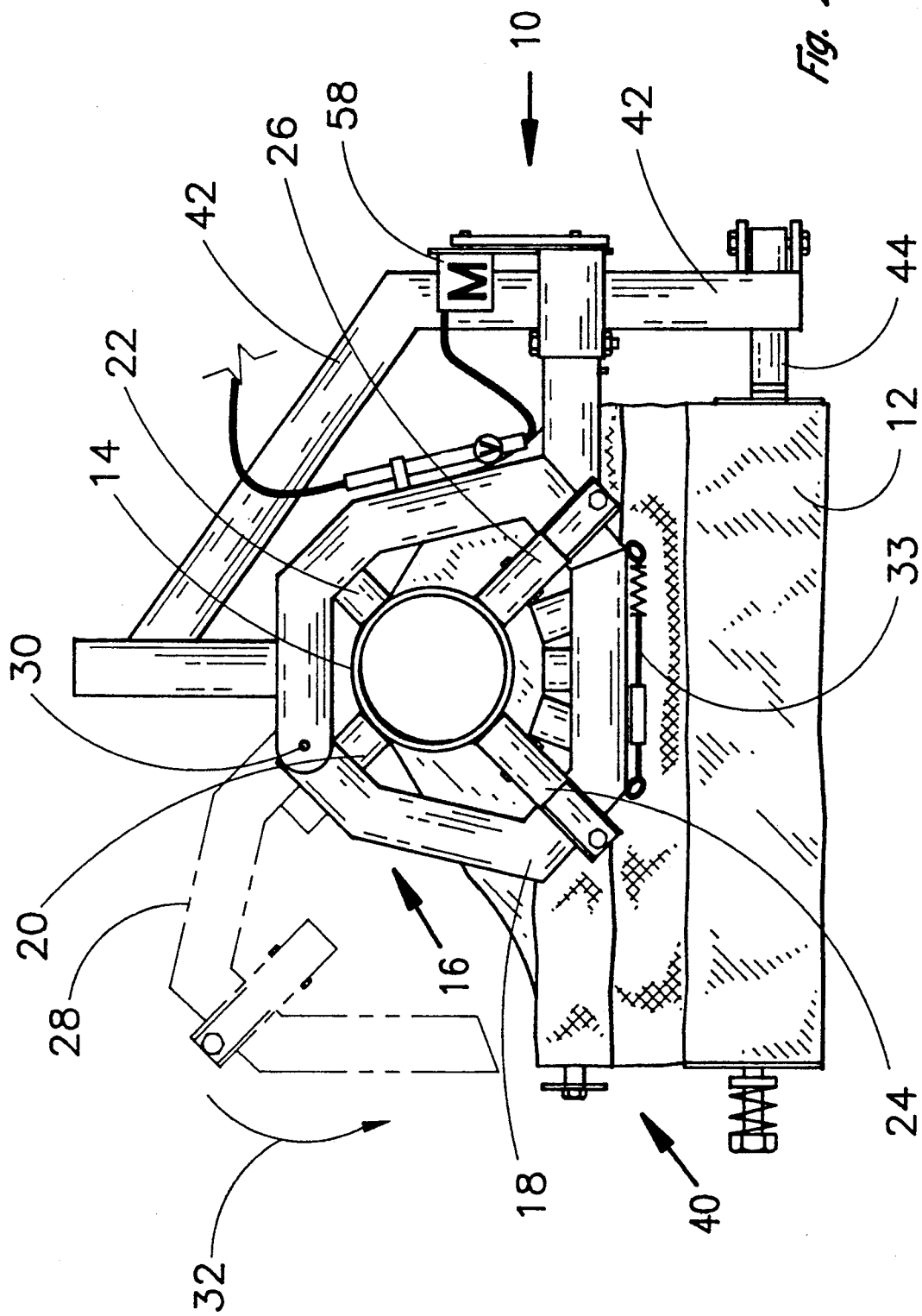
FIG. 2 is a rear view of the apparatus for applying a continuous film to a tube as seen in FIG. 1.

A carriage assembly 16 allows the apparatus to be transported axially along the exterior of the pipeline 14. The carriage assembly 16 includes a circumferential frame 18 which surrounds and is spaced from the pipeline 14. A plurality of rollers extend from the circumferential frame and engage the pipeline 14. With reference to FIG. 2, and continuing reference to FIG. 1, it will be observed that the rollers are arranged to be spaced radially around the pipeline. A pair of support rollers 20 and 22 extend from the circumferential frame and support the apparatus 10 on the pipeline 14. The apparatus will thus be suspended from the pipeline itself. A pair of adjustable rollers 24 and 26 also engage the pipeline 14.

As the apparatus is moved axially along the pipeline, the rollers 20, 22, 24 and 26 will engage the pipeline 14 and rotate.

In the embodiment shown, each roller 20, 22, 24 and 26, is radially spaced 90 degrees from adjoining rollers, although it will be appreciated that alternate arrangements are possible.

As best seen in FIG. 2, the circumferential frame 18 has a hinged portion 28 which moves about hinge 30. The hinged portion 28 will be in a closed position when the apparatus is in use on a pipeline, as seen in the drawings.

In FIG. 2, the open position of the hinged portion 28 is shown with dashed lines. The arrow 32 indicates the direction of movement of the hinged portion 28 in order to move to the closed position.

When the apparatus 10 is to be put in use, it will be brought to the field site. The hinged portion 28 will be opened so that the circumferential frame 18 may be placed around the pipeline. Thereafter, the hinged portion will be closed and a spring loaded clamp 33 retains the circumferential frame closed.

To remove the apparatus from the pipeline after use, the reverse operation is performed. The spring loaded clamp 33 will be opened and the hinged portion 28 moved to the open position. Thereafter, the circumferential frame may be removed from around the pipeline 14.

As best seen in FIG. 1, the carriage assembly 16 includes a boom arm 34 that extends longitudinally from the circumferential frame 18. The boom arm extends axially with relation to the pipeline 14. The boom arm 34 terminates in a pair of boom rollers 36 and 38 which engage the pipeline, one of which is visible in FIG. 1.

The weight of the apparatus 10 is, thus, supported on the pipeline by the support rollers 20 and 22 and by the boom rollers 36 and 38.

The continuous film 12 will be supplied from a roll having an axial opening. To retain the film or tape roll and dispense it therefrom, a tape holder assembly 40 is utilized, which is seen in FIG. 3 and which is seen with the film roll removed in FIG. 4.

The film holder assembly 40 includes an arm 42 which extends from the boom arm 34. The arm 42 terminates in a film roll rod 44 which is perpendicular to the axis of the pipeline. A spring and nut arrangement 46 retains a pair of fiber or asbestos pads 48 and 50 about a film roll 52 which provides a constant source of pressure or friction. In the absence of the pads, the roll 52 will rotate freely about the rod 44. The pressure will be adjusted by adjusting the nut, thereby adjusting the force of the spring so that the film will unwind as necessary but not overrun.

Figure 3:
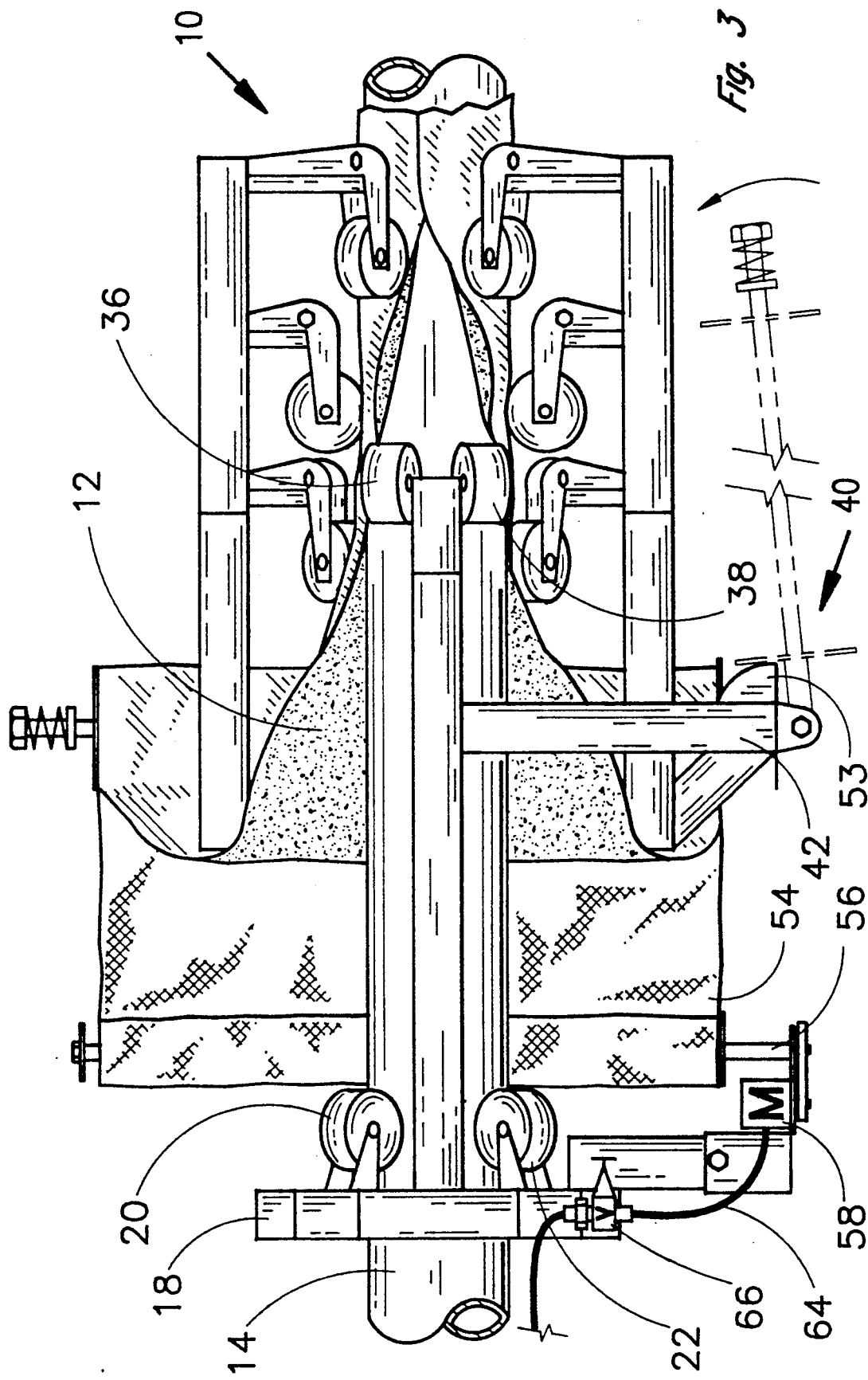
FIG. 3 is a top view of an apparatus for applying a continuous film to a tube as seen in FIG. 1.

Installation or removal of the film roll 52 may be observed from FIGS. 3 and 4. The film rod 44 is pivotally attached to the arm 42. The installation and removal position of the film rod 44 is shown in dashed lines in FIG. 3. A cam 53 assists in guiding the film roll as it moves to and from the installation and removal position. The cam has an arc that will reduce the amount of force exerted by the spring and nut arrangement in the open position.

The film 12 itself may have a strong adhesive on one side of the continuous film. A liner or backing layer 54 will be secured to the adhesive side of the tape while it is on the roll 52. Accordingly, the backing layer 54 must be removed before application of the film to the pipeline 14.

As seen in FIGS. 1, 2, and 3, an additional or take up rod 56 is spaced from and parallel to the film roll 52. As the film 12 is unwound from the roll for application to the pipeline, the backing layer 54 will be separated from the film and will be wound onto the take up rod 56.

A constant rotational force may be supplied to the take up rod 56 during the operation of the apparatus. A motor 58 supplies a rotational force to a motor pulley 60 which is engaged with the take up rod 56 by a belt 62 and a rod pulley 63. The motor may be driven in a number of ways such as by air pressure delivered from a compressor (not shown) through a hose 64. A valve 66 may be used to adjust the amount of rotational force on the take up rod. In one embodiment that has been tested, five to seven pounds of air pressure has been found to be adequate.

The motor 56 and valve 66 may be removably bolted to the carriage assembly so that they may be removed during transportation of the apparatus to the field site.

In operation, as the film 12 is unwound from the film roll 52, the take up reel 56 will automatically rotate to wind the backing layer 54 thereon.

As the film 12 is unwound from the roll 52, the backing layer will be removed as discussed. From that point, the adhesive side should only come into contact with the pipeline. The non-adhesive side will pass over a series of orientation changing rollers 68. While three rollers are provided in the present embodiment, a greater or lesser number might be utilized. The orientation of the film will change so that the adhesive side is facing the pipeline 14. The film will also be positioned so that the pipeline is centered over the film.

After the film 12 is positioned with the adhesive side facing the pipeline, and the backing layer has been removed, the film 12 is ready to be placed on and affixed to the pipeline. A first stage guide roller 72 presses a center portion of the film against the base of the pipeline. Once the first stage guide roller has pressed a center portion of the film against the pipeline, the film will not move longitudinally with respect to the pipeline.

A pair of spaced, adjacent second stage rollers 74 and 76 are spaced approximately 40 degrees radially on each side of the first roller and are spaced axially from the first roller. The guide rollers assist in shaping the continuous tape longitudinally about the circumference of the pipeline. Spaced radially approximately 40 degrees more than the second stage rollers is a pair of third stage rollers 78 and 80 which straddle the second stage rollers. The third stage rollers are also spaced axially from the second stage rollers. A final pair or fourth stage rollers 82 and 84 are spaced radially 40 degrees from the third set of rollers. The fourth stage rollers are spaced axially from the third stage rollers.

In operation, the apparatus will be moved axially with respect to the pipeline. This may be done by an operator or operators (not shown). Alternatively, a motor or other mechanism (not shown) may be provided to drive the apparatus along the pipeline. As the film 12 is unwound from the roll 52, the backing layer 54 will be threaded onto the take up rod 56. The film 12 will next pass over the orientation changing rollers 68 so that the adhesive side is facing the pipeline 14. As the apparatus continues to move, a center portion of the film 12 will be pressed against the pipeline by the first guide roller. As the apparatus progresses, the second stage rollers 74 and 76 urge the film against the pipeline. At this stage, at least 80 degrees of the circumference of the pipeline has film affixed thereto. As the apparatus progresses onward, the third stage rollers 78 and 80 urge the film against the pipeline. At this stage, at least 160° of the circumference has film affixed thereto.

The process continues until the film is pressed against the pipeline with a longitudinal seam running axially along the pipeline. An operator (not shown) may then manually press the longitudinal edges together. Thereafter, heat might be applied to the film to heat shrink the film to the pipeline.

The apparatus 10 is also able to accommodate variations which occur in the diameter of the pipeline. FIG. 5 illustrates roller 26, one of the adjustable rollers, apart from the apparatus 10. The following discussion will also pertain to adjustable roller 24 as well as all of the guide rollers 72, 74, 76, 78, 80, 82 and 84.

As seen in FIG. 5, the roller has a wheel 88 retained for rotational movement by a yoke 90. A pivot pin 92 attached to a roller bracket 94 allows the yoke to pivot about the pin. The end of the yoke opposite the wheel 88 is engaged with a spring 96. In operation, if the wheel meets a portion of a pipeline that varies in diameter, the wheel will adjust, causing the yoke to pivot about the pin and the spring 96 to compress or expand.

It has been found that the adjustable roller will easily accommodate changes of one inch in diameter of the pipeline. These changes might occur due to patches, seams or joints in the pipeline. In some instances, this may take the form of an external, circumferential steel sleeve.

In summary, the present invention provides a portable device to longitudinally wrap a continuous film on a pipeline.

Whereas, the present invention has been described in relation to the drawings attached hereto, it should be understood that other and further modifications, apart from those shown or suggested herein, may be made within the spirit and scope of this invention.

What is claimed is:

1. An apparatus for applying a continuous film to a pipeline, which apparatus comprises:
   carriage means to allow axial movement of said apparatus along said pipeline, said carriage means including a circumferential frame spaced from and surrounding said pipeline, wherein a plurality of rollers extend from said circumferential frame and engage said pipeline, said rollers including support rollers to support the apparatus on the pipeline;
   film holder means beneath said pipeline supported by said carriage means to retain and dispense said continuous film, said film having a width at least equal to the circumference of said pipeline; and
   guide roller means including a plurality of guide rollers spaced radially and axially about said pipeline to press a center portion of the film against the base of the pipeline and to shape said continuous film longitudinally about the entire circumference of said pipeline.

2. An apparatus for applying a continuous film to a pipeline as set forth in claim 1 including means to change the orientation of said film after being dispensed from said film holder means.

3. An apparatus for applying a continuous film to a pipeline as set forth in claim 2 wherein adhesive is affixed to one side of said continuous film, and wherein said means to change the orientation of said film includes orientation rollers over which said film may pass after being dispensed from film holder means so that the adhesive side of said film will be facing said pipeline.

4. An apparatus for applying a continuous film to a pipeline as set forth in claim 1 wherein four of said support rollers extend from said circumferential frame, each roller spaced 90 degrees from each adjoining roller.

5. An apparatus for applying a continuous film to a pipeline as set forth in claim 1 wherein said film includes a backing layer, and wherein said apparatus includes a take-up rod parallel to and spaced from said film holder means for receiving said backing layer thereon.

6. An apparatus for applying a continuous film to a pipeline as set forth in claim 5 including means to rotate said take-up rod.

7. An apparatus for applying a continuous film to a pipeline as set forth in claim 1 including means to propel said carriage to move axially along the exterior of said pipeline.

8. An apparatus for applying a continuous film to a pipeline as set forth in claim 1 wherein said film is stored on a roll and wherein said film holder means includes a rod for receiving said roll of film, removable retainer means to retain said film roll on said rod, and brake means to prevent said film roll from overrunning.

9. An apparatus for applying a continuous film to a pipeline as set forth in claim 1 wherein said guide rollers include a first guide roller which urges said film against said pipeline; a pair of second stage guide rollers straddling said first guide roller and spaced radially and axially from said first guide roller; a pair of third stage guide rollers straddling said second stage guide rollers and spaced radially and axially from said second stage guide rollers; and a pair of fourth stage guide rollers straddling said third stage guide rollers and spaced radially and axially from said third stage guide rollers.

10. An apparatus for applying a continuous film to a pipeline as set forth in claim 9 wherein each said second stage guide roller is spaced radially from said first guide roller approximately 40°, wherein said third stage guide rollers are spaced radially from said second stage rollers approximately 40°, and wherein said fourth stage rollers are spaced radially from said third stage rollers approximately 40°.

11. An apparatus for applying a continuous film to a pipeline as set forth in claim 1 wherein each said guide roller is spring loaded to allow movement perpendicular to the axis of said tube in response to irregularities in the diameter of said pipeline.

12. An apparatus for applying a continuous film to a pipeline as set forth in claim 1, including means to permit said guide roller means to accommodate increases in the diameter of said pipeline.

* * * * *